Patented Feb. 25, 1930

1,748,485

UNITED STATES PATENT OFFICE

MORITZ KUGEL, OF MODLING, NEAR VIENNA, AUSTRIA

ELECTROLYTE FOR LEAD ACCUMULATORS AND METHOD OF USING THE SAME

No Drawing. Application filed August 16, 1927, Serial No. 213,439, and in Germany November 6, 1926.

The working instructions given with lead-accumulators always contain a warning to the effect that the battery is not to be discharged too low nor allowed to stand for a length of time in a discharged condition, otherwise so-called harmful sulphation, i. e. the formation of large crystals of lead-sulphate, will result, causing buckling and deformation in the positive plates, the said crystals only being imperfectly and very gradually reconverted into the original products during the subsequent charging periods.

The present invention is based on the discovery of the fact that harmful sulphation cannot occur, even when the battery is left for very considerable lengths of time in a deeply discharged condition, if a slight quantity of phosphoric acid is added to the electrolyte consisting of diluted sulphuric-acid. Ten grammes of anhydrous orthophosphoric acid per litre of electrolyte has been found satisfactory, but larger or smaller quantities may be added without disadvantage. A considerable increase would merely result in the voltage and capacity of the battery being reduced somewhat. The phosphoric acid can be added to the electrolyte either in the form of orthophosphoric, metaphosphoric or pyrophosphoric acid, as the latter two forms are converted into orthophosphoric acid in the accumulator. It is, however, not advisable to add phosphates to the electrolyte, as the cations of the alkaline or ammoniacal salt in question reduce the useful life of the battery plates. It is on the other hand, permissible to employ lead phosphate alone as active material for making the plates, or to mix it with lead oxides, as well as to work lead oxides and phosphoric acid up into a workable paste which will harden, provided the plates thus produced remain continuously in the same electrolyte in which they are formed, which naturally contains the phosphoric acid originally contained in the active material of the plates.

Accumulators provided with electrolyte as described in this invention present a great practical advantage compared with those hitherto employed, for, as a result of the absence of all harmful sulphation, they are quite unaffected by deep discharges and lengthy standing in discharged condition, and consequently do not demand careful, skilled attendance.

It has been found that the phosphoric-acid contents of the electrolyte above described become reduced in the course of lengthy service, the phosphoric acid chemically combining with, or being absorbed to a certain extent by the positive electrodes and the sediment at the bottom of the cell, and thus losing its efficacy in preventing sulphation. As, from what has been said above, there are disadvantages in considerably increasing the quantity of phosphoric acid originally added to the electrolyte above ten grammes per litre, a permanent and continuous prevention of harmful sulphation may be attained by adding in the course of operation such quantities of phosphoric acid as are chemically or otherwise absorbed by the lead peroxide i. e. maintaining the proportion of approximately 10 grammes of phosphoric acid to one litre of electrolyte. This can be done by suitably acidulating the water added to replenish evaporation, etc. with phosphoric acid.

What I claim is:

An electrolyte for lead accumulators which consists of dilute sulphuric acid with an addition of approximately 10 grams of phosphoric acid per liter.

In testimony whereof I affix my signature.

MORITZ KUGEL.